United States Patent
Farris et al.

(10) Patent No.: US 7,326,761 B1
(45) Date of Patent: *Feb. 5, 2008

(54) SELECTIVE HYDROSILYLATION METHOD AND PRODUCT

(75) Inventors: David D Farris, Marietta, OH (US); Chauncey J Rinard, Newport, OH (US); Mark D Leatherman, Elmsford, NY (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/503,213

(22) Filed: Aug. 14, 2006

Related U.S. Application Data

(62) Division of application No. 11/457,446, filed on Jul. 13, 2006, now Pat. No. 7,259,220.

(51) Int. Cl.
*C08G 77/08* (2006.01)

(52) U.S. Cl. .................. 528/15; 528/29; 528/31; 528/35; 556/445; 556/434

(58) Field of Classification Search ............... 528/15, 528/29, 31, 35; 556/445, 434
See application file for complete search history.

(56) References Cited

U.S. PATENT DOCUMENTS

| | | | |
|---|---|---|---|
| 3,159,601 A | 12/1964 | Ashby | |
| 3,220,972 A | 11/1965 | Lamoreaux | |
| 3,715,334 A | 2/1973 | Karstedt | |
| 3,775,452 A | 11/1973 | Karstedt | |
| 3,814,730 A | 6/1974 | Karstedt | |
| 4,288,345 A | 9/1981 | Ashby | |
| 4,340,647 A * | 7/1982 | Eckberg | 428/429 |
| 4,421,903 A | 12/1983 | Ashby | |
| 4,572,791 A | 2/1986 | Onopchenko | |
| 4,578,497 A | 3/1986 | Onopchenko | |
| 4,847,398 A | 7/1989 | Mehta | |
| 4,857,583 A | 8/1989 | Austin | |
| 4,946,818 A | 8/1990 | Lewis | |
| 5,128,494 A | 7/1992 | Blum | |
| 5,153,293 A | 10/1992 | Hales | |
| 5,159,096 A | 10/1992 | Austin | |
| 5,169,962 A | 12/1992 | Crivello | |
| 5,169,996 A | 12/1992 | Crooker | |
| 5,191,103 A | 3/1993 | Mehta | |
| 5,484,950 A * | 1/1996 | Crivello | 549/215 |
| 5,559,264 A | 9/1996 | Bowman | |
| 5,986,022 A | 11/1999 | Austin | |
| 5,986,122 A | 11/1999 | Lewis | |
| 6,015,920 A | 1/2000 | Schilling | |
| 6,046,156 A | 4/2000 | Perry | |
| 6,054,547 A | 4/2000 | Perry | |
| 6,075,111 A | 6/2000 | Perry | |
| 6,077,923 A | 6/2000 | Perry | |
| 6,083,901 A | 7/2000 | Perry | |
| 6,153,578 A | 11/2000 | Perry | |
| 6,346,553 B1 | 2/2002 | LeGrow | |
| 6,410,772 B2 | 6/2002 | Okuyama | |
| 6,448,336 B1 | 9/2002 | Toyoshima | |
| 6,669,949 B2 * | 12/2003 | Kennedy et al. | 424/405 |
| 6,890,886 B2 | 5/2005 | Policello | |
| 6,897,280 B2 | 5/2005 | Heisler | |
| 2004/0198905 A1 | 10/2004 | Mori | |
| 2005/0265942 A1 | 12/2005 | Rajaraman | |
| 2005/0267258 A1 | 12/2005 | Rajaraman | |
| 2006/0089455 A1 | 4/2006 | Sterin | |

OTHER PUBLICATIONS

LaRonde et al., *Controlling silica surfaces using responsive coupling agents*, Colloid Polym. Sci. 281, 391-400 (2003).

Nagashima et al., *(PPh 3) RhCl-Catalyzed Hydrosilylation of Unsaturated Molecures by 1,2-Bis (dinethylsillyl) ethane: Unprecedented Rate Difference between Two Si-H Bonds*, Organometallics 8, 2495-2496 (May 1969).

J. L. Speier, Homogeneous Catalysts of Hydrosilation by Transistion Metals, Advances In Organometallic Chemistry, 17, 407-447, (1979).

Marciniec, Comprehensive Handbook on Hydrosilylation, Pergamon Press (1992).

* cited by examiner

*Primary Examiner*—Margaret G. Moore
(74) *Attorney, Agent, or Firm*—Philip D. Freedman PC; Philip D. Freedman; Kenneth S. Wheelock

(57) ABSTRACT

An asymmetric siloxane is made by reacting a silicone having the formula $M^H D_x M^{H'}$ where $M^H$ is $R^1 R^2 HSiO_{1/2}$, $M^{H'}$ is $R^4 R^5 HSiO_{1/2}$ and x is an integer $0 \leq x \leq 10$ under selective hydrosilylation conditions in the presence of a precious metal hydrosilylation catalyst, with a first olefinic compound and in a second step, a monohydridosiloxane produced in the first step is reacted under hydrosilylating conditions with another olefinic compound different from the first olefinic compound.

18 Claims, No Drawings

SELECTIVE HYDROSILYLATION METHOD AND PRODUCT

This application is a division of David D FARRIS et al. Ser. No. 11/457,446 filed Jul. 13, 2006 now U.S. Pat. No. 7,259,220, entitled: SELECTIVE HYDROSILYLATION METHOD.

BACKGROUND OF THE INVENTION

The invention relates to a selective process for hydrosilylation of dihydridosiloxanes in the manufacture of asymmetric organosiloxanes containing at least one polyalkylene oxide group. More specifically, the invention relates to a method to make an asymmetric siloxane containing at least one polyalkylene oxide group and novel compositions.

Organosiloxanes containing polyalkylene oxide groups may be used as dispersants, wetting agents, spreading agents and emulsifiers in agricultural chemical formulations and in other wetting, spreading, foaming and detergent applications. Formulations containing organosiloxanes are commonly used in forestry, agriculture, and horticulture as agricultural adjuvants to improve efficacy of agrochemical active ingredients such as micronutrients, growth regulators, biologicals, pesticides such as herbicides, fungicides, insecticides, acaracides and miticides.

Organosiloxanes may be formed from a reaction of a hydridosiloxane with an olefin such as an aliphatic olefin or olefin-terminated polyalkylene oxide such as allyl-, vinyl- and methallyl-terminated polyalkylene oxides. Likewise, olefins such as allyl chloride or 1-octene may be reacted with a hydridosilane such as trimethoxysilane in the presence of an appropriate precious metal catalyst. These precious metal catalysts include complexes of rhodium, ruthenium, palladium, osmium, iridium or platinum.

Many of these known organosiloxanes may only be used in aqueous formulations within a narrow pH range, ranging from a slightly acidic pH of 6 to a very mildly basic pH of 7.5. Outside this narrow pH range, these known organosiloxanes may not be stable to hydrolysis undergoing rapid decomposition. Recently, asymmetric organosiloxanes that contain at least one polyalkylene oxide group have been disclosed that provide stable performance in aqueous formulations that are outside of this narrow pH range. However, these asymmetric organosiloxanes are difficult to manufacture because the processes are not selective. These processes generate mixtures of components that have undesirable characteristics, such as a decrease in the wetting and spreading properties of the organosiloxanes. Therefore, a need exists for an efficient, selective and cost effective process to make these asymmetric organosiloxanes.

BRIEF DESCRIPTION OF THE INVENTION

The invention relates to an efficient and cost effective process to make asymmetric organosiloxanes that can contain at least one polyalkylene oxide group.

The invention can be described as a method to make an asymmetric organosiloxane comprising in a first step, reacting a dihydridosiloxane under hydrosilylation conditions in the presence of a precious metal hydrosilylation catalyst, with an hydrocarbon or heterocarbon compound containing a terminal carbon to carbon double bond to form a monohydridosiloxane, and in a second step, hydrosilylating the monohydridosiloxane with a second and different hydrocarbon or heterocarbon compound containing a terminal carbon to carbon double bond and in the presence of the same or different hydrosilylation catalyst under hydrosilylation conditions to form an asymmetrically substituted organosiloxane, wherein the asymmetric organosiloxane product contains at least one polyalkylene oxide group.

In an embodiment, the invention is a method to form a monohydridosiloxane, comprising effecting a hydrosilylation of a molar excess of greater than 1:1 up to less than 4:1 of dihydridosiloxane of the formula $M^H D_x M^H$ where $M^H$ is $R^1 R^2 HSiO_{1/2}$, $M^H$ is $R^4 R^5 HSiO_{1/2}$ and x is an integer such that $0 \leq x \leq 10$ bond, in the presence of a rhodium hydrosilylation catalyst with a compound having an aliphatic unsaturated double bond; where each of $R^1$, $R^2$, $R^4$ and $R^5$ is independently the same or different and each is a hydrocarbon radical, an alkoxy radical or alkenyloxy radical; and recovering a monohydridosiloxane.

In another embodiment, the invention is a method to make an asymmetric siloxane, comprising: in a first step, reacting a silicone having the formula $M^H D_x M'H$ where $M^H$ is $R^1 R^2 HSiO_{1/2}$, M'H is $R^4 R^5 HSiO_{1/2}$ and x is an integer $0 \leq x \leq 10$ under selective hydrosilylation conditions in the presence of a rhodium catalyst, with an olefinic compound containing one or more terminal carbon to carbon double bonds to form a monohydridosiloxane; where each of $R^1$, $R^2$, $R^4$ and $R^5$ is independently the same or different and each is a hydrocarbon radical, an alkoxy radical or alkenyloxy radical; and in a second step, hydrosilylating the monohydridosiloxane with an polyalkylene oxide of 2 to 10 carbon atoms and different from the first olefinic compound and having one or more alkylene oxide groups containing one or more terminal carbon to carbon double bonds to form an asymmetric siloxane. In another embodiment, the invention is a method to form an asymmetric siloxane, comprising: effecting a monoselective hydrosilylation reaction between a molar excess of a dihydridosiloxane and a first aliphatic unsaturated compound in the presence of a rhodium hydrosilylation catalyst to form a monohydridosiloxane; and hydrosilylating the monohydridosiloxane with alkylene oxide compound containing one or more terminal carbon to carbon double bonds to form an asymmetric siloxane.

In still another embodiment, the invention is a method to form an asymmetric siloxane; comprising adding a molar excess of less than 4:1 of a dihydridosiloxane to an aliphatic unsaturated compound in the presence of a precious metal hydrosilylation catalyst and adding an alkylene oxide containing one or more terminal carbon to carbon double bonds to complete hydrosilylation to form an asymmetrically substituted siloxane.

In still another embodiment, the invention is a method to make an asymmetrically substituted organosiloxane containing at least one polyalkylene oxide group comprising, (a) in a first step, reacting a dihydridosiloxane having the chemical formula

in the presence of a precious metal catalysts independently selected from the group consisting of rhodium, ruthenium, palladium, osmium, iridium and platinum under selective hydrosilylation conditions with an unsaturated hydrocarbon containing from about 2 to about 100 carbon atoms, and one or more terminal carbon to carbon double bonds or with an unsaturated heterocarbon containing from about 3 to about 100 carbon atoms, one or more terminal carbon to carbon double bonds and at least one oxygen or at least one silicon atom that has replaced a carbon atom to form a monohydridosiloxane wherein: each occurrence of $M^H$ is independently selected from the species $R^1R^2HSiO_{1/2}$; each occurrence of $M^H$ is independently selected from the species $R^4R^5HSiO_{1/2}$; each occurrence of D is independently selected from the species $(R)_2SiO$; each occurrence of the subscript x is independently an integer from about 0 to about 10; each occurrence of R, $R^1$, $R^2$, $R^4$ and $R^5$ is independently selected from the group consisting of a hydrocarbon of from 1 to about 50 carbon atoms and a heterocarbon of from about 1 to 100 carbon atoms containing at least one oxygen or at least one silicon atom that has replaced a carbon atom; and (b) in a second step, hydrosilylating the monohydridosiloxane with a different unsaturated hydrocarbon containing from about 2 to about 100 carbon atoms and one or more terminal carbon to carbon double bonds or with a different unsaturated heterocarbon containing from about 3 to about 100 carbon atoms, one or more terminal carbon to carbon double bonds and at least one oxygen or at least one silicon atom that has replaced a carbon atom in the presence of the same or different precious metal hydrosilylation catalyst to form an asymmetric siloxane and with the proviso that at least one heterocarbon containing one or more terminal carbon to carbon double bond is a polyalkylene oxide compound with one or more terminal carbon to carbon double bonds.

In another embodiment, the invention is an asymmetric siloxane, comprising: $MD_xM'$ where $M=R^1R^2R^3SiO_{1/2}$ and and $M'=R^4R^5R^6SiO_{1/2}$; wherein $D=(R)_2SiO$, and x is an integer $0 \leq x \leq 10$; each of R, $R^1$, $R^2$, $R^4$ and $R^5$ is independently the same or different and each is a hydrocarbon radical, an alkoxy radical or alkenyloxy radical and each of $R^3$ and $R^6$ is independently a different alkylene oxide moiety of 2 to 10 carbon atoms.

In another embodiment, the invention is an asymmetric siloxane, comprising: the chemical of the formula $MD_xM'$ wherein each occurrence of M is independently $R^1R^2R^3SiO_{1/2}$; each occurrence of M' is $R^4R^5R^6 SiO_{1/2}$; each occurrence of D is independently $(R)_2SiO$; each occurrence of the subscript x is independently an integer from about 0 to about 10; each occurrence of $R^1$, $R^2$, $R^4$ and $R^5$ is independently selected from the group consisting of the same or different monovalent hydrocarbon radical of from 3 to 6 carbon atoms and the $R^8R^9R^{10}SiR^{12}$ radical wherein each occurrence $R^8$, $R^9$ and $R^{10}$ is independently a monovalent hydrocarbon radical having from 1 to 6 carbon atoms, a monovalent aryl hydrocarbon radical having from 6 to 13 carbon atoms or a monovalent alkaryl hydrocarbon radical having from 6 to 13 carbon atoms and $R^{12}$ is a divalent hydrocarbon radical having from 1 to 3 carbon atoms; and each occurrence of $R^3$ and $R^6$ is independently a different polyalkylene oxide moiety of 3 to 10 carbon atoms.

In another embodiment, the invention is an asymmetric siloxane comprising 1-(2-trimethylsilylethyl)-1,1,3,3-tetramethyldisiloxane.

In another embodiment, the invention is pesticidal composition, comprising at least one active pesticide and an asymmetric siloxane.

In still another embodiment, the invention is fungicide composition, comprising at least one active fungicide and an asymmetric siloxane.

In still another embodiment, the invention is an agricultural or horticultural formulation, comprising a herbicide and an asymmetric siloxane adjuvant.

In still another embodiment, the invention is an agricultural or horticultural formulation, comprising a pesticide and an asymmetric siloxane adjuvant.

In still another embodiment, the invention is a coating composition, comprising an active coating component and an asymmetric siloxane wetting agent or surfactant.

And, in still another embodiment, the invention is a personal care emulsion, comprising an aqueous discontinuous phase and a continuous phase comprising an asymmetric siloxane.

And, in another embodiment, the invention is a personal care emulsion, comprising a continuous non-aqueous hydroxylic solvent phase and a discontinuous phase comprising an asymmetric siloxane.

In still another embodiment, the invention is a home care composition comprising an active cleaning, softening or polishing component and an asymmetric siloxane.

In another embodiment, the invention is a surfactant composition, comprising an asymmetric siloxane and an active co-surfactant.

DETAILED DESCRIPTION OF THE INVENTION

The invention relates to an efficient and cost effective process to make asymmetric organosiloxanes that contain at least one polyalkylene oxide group comprising in a first step, reacting a dihydridosiloxane under hydrosilylation conditions in the presence of a precious metal hydrosilylation catalysts, with an hydrocarbon or heterocarbon compound containing a terminal carbon to carbon double bond to form a monohydridosiloxane, and in a second step, hydrosilylating the monohydridosiloxane with a second and different hydrocarbon or heterocarbon compound containing a terminal carbon to carbon double bond and in the presence of the same or different hydrosilylation catalyst under hydrosilylation conditions to form an asymmetrically substituted organosiloxane.

In another embodiment, the invention is a method to form a monohydridosiloxane, comprising effecting a hydrosilylation of a molar excess of greater than 1:1 up to less than 4:1 of dihydridosiloxane having the chemical Formula (1):

$$M^HD_xM^H \qquad (1)$$

wherein $M^H$, $M^H$, D and x are defined above, in the presence of a rhodium hydrosilylation catalyst with an unsaturated hydrocarbon containing from about 2 to about 100 carbon atoms, one or more terminal carbon to carbon double bonds or with an unsaturated heteroatom containing from about 3 to about 100 carbon atoms, at least one oxygen atom or at least one silicon atom and one or more terminal carbon to carbon double bonds to give a monohydridosiloxane and recovering the monohydridosiloxane.

In another embodiment, the invention is a method to make an asymmetric siloxane containing at least one polyalkylene oxide group, comprising in a first step, reacting a dihydridosiloxane having the chemical Formula (1):

$$M^HD_xM^H \qquad (1)$$

wherein $M^H$, $M^H$, D and x are defined above and each occurrence of R, $R^1$, $R^2$, $R^4$ and $R^5$ is independently the same or different and each is a hydrocarbon radical, an alkoxy radical or alkenyloxy radical containing from about 1 to 50 carbon atoms, in the presence of a precious metal catalyst, and more specifically a rhodium catalyst, under selective hydrosilylation conditions, with an unsaturated hydrocarbon containing from about 2 to about 50 carbon atoms and one or more terminal carbon to carbon double bonds or with an unsaturated heterocarbon containing from about 3 to 50 carbon atoms, at least one silicon or oxygen atom, and one or more terminal carbon to carbon double bonds to form a monohydridosiloxane; and in a second step, hydrosilylating the monohydridosiloxane with an unsaturated heterocarbon containing from about 2 to about 50 carbon atoms, at least one oxygen atom and one or more terminal carbon to carbon double bonds, and more specifically, an unsaturated polyalkylene oxide containing from about 4 to about 50 carbon atoms and one or more terminal carbon to carbon double bond and different from the first unsaturated hydrocarbon or heterocarbon in the presence of the same or different precious metal hydrosilylation catalyst to form an asymmetric siloxane.

In another embodiment, the present invention is a method to form an asymmetric siloxane, comprising effecting a selective hydrosilylation reaction between a dihydridosiloxane and a first aliphatic unsaturated hydrocarbon containing one or more terminal carbon to carbon double bonds in the presence of a precious metal catalyst, and more specifically, a rhodium hydrosilylation catalyst, to form a monohydridosiloxane; and, in a second step, hydrosilylating the monohydridosiloxane with another different aliphatic unsaturated hydrocarbon containing one or more terminal carbon to carbon double bonds to form an asymmetric siloxane.

In another embodiment, the present invention is a method of form an asymmetric siloxane containing at least one carbon to carbon double bonds comprising adding a molar excess of less than 4:1 of a dihydridosiloxane to an aliphatic unsaturated hydrocarbon containing one or more terminal carbon to carbon double bonds in the presence of a precious metal hydrosilylation catalyst and, in a second step, adding a alkylene oxide containing a terminal carbon to carbon double bond to complete hydrosilylation and to form an asymmetrically substituted siloxane.

In yet another embodiment, the invention is an asymmetric siloxane comprising the chemical Formula (5):

$$MD_xM' \quad (5)$$

wherein M is $R^1R^2R^3SiO_{1/2}$; M' is $R^4R^5R^6SiO_{1/2}$; x is independently an integer from about 0 to about 10; each occurrence of R, $R^1$, $R^2$, $R^4$ and $R^5$ is independently the same or different and defined above; and each occurrence of $R^3$ and $R^6$ is independently a heterocarbon radical containing from about 3 to about 10 carbon atoms, and at least one oxygen atom and with the proviso that $R^3$ is different from $R^6$, and more specifically an polyalkylene oxide moiety of 3 to 10 carbon atoms.

In another embodiment, the invention is an asymmetric organosiloxane comprising 1-(2-trimethylsilylethyl)-1,1,3,3-tetramethyldisiloxane.

Important organosiloxanes are made by one or more of the methods described in copending and commonly assigned patent applications Rajaraman et al. U.S. patent application Ser. No. 11/300,100, filed 13 Dec. 2005, (Attorney Docket Number 199812), U.S. patent application Ser. No. 11/350,426, filed 09 Feb. 2006 (Attorney Docket Number 202973) and U.S. patent Ser. No. 11/379,592, filed 21 Apr. 2006 (Attorney Docket Number 203252).

Rajaraman et al. U.S. patent application Ser. No. 11/300,100, filed 13 Dec. 2005 teaches a disiloxane surfactant compositions comprising a silicone composition comprising a silicone having the formula, MM', wherein M is $R_1R^2R^3SiO_{1/2}$ and M' is $R^4R^5R^6SiO_{1/2}$ with $R^3$ selected from the group consisting of branched monovalent hydrocarbon radical of from 3 to 6 carbon atoms and $R^8R^9R^{10}SiR^{12}$ radical wherein each occurrence of $R^8$, $R^9$, and $R^{10}$ is independently selected from the group of monovalent hydrocarbon radicals having from 1 to 6 carbon atoms and monovalent aryl hydrocarbon or aralkyl hydrocarbon radicals having from 6 to 13 carbon atoms and $R^{12}$ is a divalent hydrocarbon radical having from 1 to 3 carbon atoms, $R^1$ and $R^2$ are each independently selected from the group of from 1 to 6 carbon atom monovalent hydrocarbon radicals or $R^3$, $R^6$ is an polyalkylene oxide of the general Formula (6):

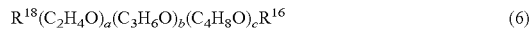

wherein $R^{18}$ is a divalent linear or branched hydrocarbon radical having the structure —$CH_2$—$CH(R^{13})(R^{12})_dO$— where $R^{13}$ is hydrogen or methyl; $R^{16}$ is a divalent alkyl radical of 1 to 6 carbons where the subscript d may be 0 or 1; $R^{16}$ is selected from the group consisting of hydrogen, monovalent hydrocarbon radicals of from 1 to 6 carbon atoms and acetyl where the subscripts a, b and c are zero or positive and satisfy the following relationships: $2 \leq a+b+c \leq 20$ with $a \geq 2$, and $R^4$ and $R^5$ are each independently selected from the group of monovalent hydrocarbon radicals having from 1 to 6 carbon atoms or $R^6$.

U.S. patent application Ser. No. 11/300,100 teaches a composition comprising a siloxane having the formula, MM', wherein M is $R^1R^2R^3SiO_{1/2}$ and M' is $R^4R^5R^6SiO_{1/2}$; with $R^3$ selected from the group consisting of branched monovalent hydrocarbon radical of from 3 to 6 carbon atoms and $R^8R^9R^{10}SiR^{12}$ with $R^8$, $R^9$, and $R^{10}$ each independently selected from the group of monovalent hydrocarbon radicals having from 1 to 6 carbon atoms and monovalent aryl or aralkyl hydrocarbon radicals having from 6 to 13 carbon atoms and $R^{12}$ is a divalent hydrocarbon radical having from 1 to 3 carbon atoms, $R^1$ and $R^2$ are each independently selected from the group of from 1 to 6 carbon atom monovalent hydrocarbon radicals or $R^3$, $R^6$ is a polyalkylene oxide of the general Formula (7):

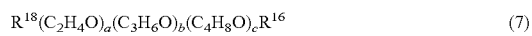

wherein each occurrence of $R^{18}$ is a divalent linear or branched hydrocarbon radical having the structure, —$CH_2$—$CH(R^{13})(R^{12})_dO$—, wherein $R^{13}$ is hydrogen or methyl; $R^{12}$ is a divalent alkyl radical of 1 to 6 carbons where the subscript d may be 0 or 1; $R^{16}$ is selected from the group consisting of hydrogen, monovalent hydrocarbon radicals of from 1 to 6 carbon atoms and acetyl where the subscripts a, b and c are zero or positive and satisfy the following relationships: $2 \leq a+b+c \leq 20$ with $a \geq 2$, and $R^4$ and $R^5$ are each independently selected from the group of monovalent hydrocarbon radicals having from 1 to 6 carbon atoms or $R^6$.

U.S. patent application Ser. No. 11/350,426 teaches a trisilicone composition comprising a silicone having the formula, $MD^1M'$, wherein M is $(R^1)(R^2)(R^3)SiO_{1/2}$; M' is $(R^4)(R^5)(R^6)SiO_{1/2}$; and $D^1$ is $(R)(Z)SiO_{2/2}$ where $R^3$ is selected from the group of monovalent hydrocarbon radicals consisting of branched or linear hydrocarbon group consisting of 2 to 4 carbons, aryl, and an alkyl hydrocarbon group of 4 to 9 carbons containing aryl constituents of 6 to 20 carbon atoms; R, $R^1$, $R^2$, $R^4$, $R^5$, and $R^6$ are each independently selected from the group consisting of 1 to 4 carbon monovalent hydrocarbon radicals, aryl, and a hydrocarbon group of 4 to 9 carbons containing an aryl group; Z is an alkylene oxide group of the general Formula (8):

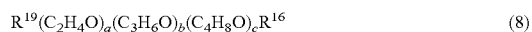

wherein $R^{19}$ is a linear or branched divalent hydrocarbon radical of 2, 3, 5, 6, 7, 8, or 9 carbon atoms; $R^{16}$ is selected from the group consisting of hydrogen, monovalent hydrocarbon radicals of from 1 to 6 carbon atoms and acetyl, and the subscripts a, b and c are zero or positive and satisfy the following relationships: $2 \leq a+b+c \leq 20$ with $a \geq 2$.

U.S. patent application Ser. No. 11/379,592 teaches a composition comprising a silicon containing compound having the Formula (9):

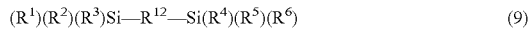

$$(R^1)(R^2)(R^3)Si-R^{12}-Si(R^4)(R^5)(R^6) \quad (9)$$

wherein $R^1$, $R^2$, $R^3$, $R^4$, and $R^5$ are each independently selected from the group consisting of 1 to 6 monovalent hydrocarbon radicals, aryl, and a hydrocarbon group of 7 to 10 carbons containing an aryl group; $R^{12}$ is a hydrocarbon group of 1 to 3 carbon; $R^6$ is an alkylene oxide group of the general Formula (7):

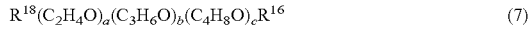

$$R^{18}(C_2H_4O)_a(C_3H_6O)_b(C_4H_8O)_cR^{16} \quad (7)$$

where $R^{18}$ is a divalent linear or branched hydrocarbon radical having the structure $-CH_2-CH(R^{13})(R^{12})_dO-$ where $R^{13}$ is hydrogen or methyl; $R^{12}$ is a divalent alkyl radical of 1 to 6 carbons where the subscript d may be 0 or 1; $R^{16}$ is selected from the group consisting of hydrogen, monovalent hydrocarbon radicals of 1 to 6 carbon atoms and acetyl, subject to the limitation that the subscripts a, b and c are zero or positive and satisfy the following relationships: $2 \leq a+b+c \leq 20$ with $a \geq 2$.

In an embodiment of the present invention, $M^H D_x M^{tH}$ is reacted under hydrosilylation conditions, with a reactant containing one or more carbon-to-carbon double bonds, such as a hydrocarbon or heterocarbon compound containing a terminal carbon to carbon double bond or an olefinically modified polyalkylene oxide. In $M^H D_x M^{tH}$ and $M^{tH}$ are the same or different hydride precursors to an M structural unit where M is $R^1R^2R^3SiO_{1/2}$ and M' is $R^4R^5R^6SiO_{1/2}$.

In an embodiment of the invention, a dihydridosiloxane of the formula $M^H D_x M^{tH}$ is reacted in a first step hydrosilylation reaction with a first polyalkylene oxide having one or more alkylene oxide groups containing one or more terminal carbon to carbon double bonds to form a monohydridosiloxane. Then, the monohydridosiloxane from the first step is hydrosilylated with another polyalkylene oxide different from the first polyalkylene oxide and having one or more alkylene oxide groups containing one or more terminal carbon-to-carbon double bonds to form an asymmetric siloxane. In this embodiment, D is $(R)_2SiO$ with x an integer ranging from about 0 to about 10. In a specific embodiment, $x=0$ and the dihydridosiloxane is $M^H M^{tH}$. In $(R)_2SiO$, each R group is independently the same or different and each represents a hydrocarbon radical or an alkoxy or polyalkenyloxy radical.

A second step of an embodiment of the inventive process comprises hydrosilylating the monohydridosiloxane formed in the first step with another polyalkylene oxide different from the first polyalkylene oxide and having one or more alkylene oxide groups containing one or more terminal carbon to carbon double bonds to form an asymmetric siloxane.

DIHYDRIDOSILOXANE

A "dihydridosiloxane" as used herein is a compound that contains two or more silicon-hydrogen bonds and one or more silicon-oxygen bonds. The term is intended to include oligomeric, cyclomeric, polymeric and copolymeric hydridosiloxanes. The term "hydrosilylation" refers to the addition of Si—H bonds to carbon-to-carbon double bonds like C=C. The term "selective hydrosilylation conditions" means conditions that result in selective hydrosilylation substantially at a single hydride position of a dihydride starting material. The conditions may be combinations of reactant molar ratios and catalyst.

The dihydridosiloxane starting material of the invention process is typically a fluid with a hydrogen content of from about 25 cc/gm to about 334 cc/gm and more specifically from about 150 cc/gm to about 334 cc/gm. The dihydridosiloxane may run a range of reactants from a monomer reactant, such as 1,1,3,3-tetramethyldisiloxane ($M^H M^{tH}$) to a polymer equilibrate fluid reactant having a structure of $M^H D_x M^{tH}$, wherein $M^H$ is $R^1R^2HSiO_{1/2}$, $M^{tH}$ is the same or different $R^4R^5HSiO_{1/2}$ and $D=(R)_2SiO$ where R, $R^1$, $R^2$, $R^4$ and $R^5$ are defined above and x is an integer such that the structures include materials of the range from about 0 to about 10, more specially from about 0 to about 2, and most specifically, about 0. The formula given here and elsewhere herein, such as $M^H D_x M^{tH}$, are to be understood as representing average compositions of statistical polymers, unless otherwise noted.

Representative examples of suitable R, $R^1$, $R^2$, $R^4$ and $R^5$ radicals are $C_1$ to $C_{12}$ alkyl radicals, such as the non-limiting examples of methyl, ethyl, propyl, butyl, isopentyl, n-hexyl, and decyl; cycloaliphatic radicals containing 5 to 12 carbon atoms, such as the non-limiting examples of cyclopentyl, cyclohexyl, methylcyclohexyl, norbornyl, and cyclooctyl; aralkyl radicals, such as the non-limiting examples of phenylethyl, benzyl and 2-phenyl-1-methylethyl; and aryl radicals, such as the non-limiting examples of phenyl and napthyl; optionally substituted with 1 to 6 alkyl groups of up to 6 carbon atoms, such as the non-limiting examples of tolyl and xylyl; alkoxy radicals containing form about 1 to about 12 carbon atoms, such as methoxy, ethoxy, propoxy, butoxy, and decyloxy and more specifically alkoxy radical containing from about 3 to about 6 carbon atoms, such as the non-limiting examples of isopropyl, isobutyl, neopentyl, isopentyl and neohexyl. Illustrative examples of R also include polyalkyleneoxy radicals, such as the non-limiting examples of $CH_3O(CH_2CH_2O)_a(CH_2CH(CH_3)O)_b-CH_2CH_2CH_2-$, $CH_3C(=O)O(CH_2CH_2O)_a(CH_2CH(CH_3)O)_b-CH_2CH_2CH_2-$ and $CH_3CH_2CH_2CH_2O(CH_2CH_2O)_a(CH_2CH(CH_3)O)_b-CH_2CH_2CH_2-$, in which the subscripts a and b may vary from 0 to about 200 and $a+b>0$. A specific example of R, $R^1$, $R^2$, $R^4$ or $R^5$ radical is methyl.

OLEFINIC REACTANT

The hydrocarbon or heterocarbon reactants containing one or more terminal carbon to carbon double bonds employed in the practice of the present invention may be any that react with a hydridosilane or hydridosiloxane in the desired reaction. As employed herein, the term "hydrocarbon" means any organic compound that contains carbon and hydrogen atoms and includes unsaturated hydrocarbons, that has an ethylenic or acetylenic unsaturation capable of being hydrosilylated, including acetylene, allyl, and vinyl starting materials. As employed herein, the term "heterocarbon" means any hydrocarbon in which one or more carbon atoms are replaced with an oxygen atom or a silicon atom.

In an embodiment of the present invention, a specific heterocarbon containing one or more terminal carbon to carbon double bonds for use in the practice of the first step of the present invention is a vinylsilane, such as the non-limiting examples trimethylvinylsilane, triethylvinylsilane, dimethyl-tert-butoxyvinylsilane, dimethylisopropoxyvinylsilane, tris-(trimethylsiloxy)vinylsilane, methyl-bis-(tert-butoxy)vinylsilane and tris-(tert-butoxy)vinylsilane, while a specific heterocarbon containing one or more terminal carbon to carbon double bonds in the second step is a terminally unsaturated polyalkylene oxide.

In still another embodiment, other useful hydrocarbon or heterocarbon reactants containing one or more terminal double bonds include but are not limited to an olefin started alkane, such as the non-limiting examples, 1-octene, 1-hexene, amylene, and 1-octadecene; an olefin started alcohol, and an olefin substituted epoxide, such as the non-limiting examples allyl glycidyl ether, or vinylcyclohexene monoxide.

In yet another embodiment, heterocarbon reactants containing one or more terminal carbon to carbon double bonds include terminally unsaturated polyalkylene oxides corresponding to the Formula (10):

$$R^{20}(OC_aH_{2a})_nOR^{21} \tag{10}$$

wherein each occurrence of a is independently an integer from about 2 to about 4 for each unit; each occurrence of n is independently an integer from about 1 to about 200; each occurrence of $R^{20}$ is independently an alkenyl group and specifically an alpha-olefinic group containing from about 2 to about 10 carbon atoms and most specifically an allyl, methallyl or vinyl group; and each occurrence of $R^{21}$ is independently selected from the group of a monovalent radical and more specifically a hydrogen, an alkyl group containing 1 to 5 carbon atoms, an acyl group containing 2 to 5 carbon atoms, a 2-oxacycloalkyl group of 4 to 6 group atoms and a trialkylsilyl group.

It is understood that the polyalkylene oxide moiety may be a block or random copolymer of oxyethylene, oxypropylene or oxybutylene units and is typically a blend of molecules of varying chain length and composition and in the foregoing formula. In an embodiment, "olefinically modified polyalkylene oxide" is a molecule possessing one or more alkylene oxide groups containing one or more, terminal or pendant, carbon-carbon double bonds. Representative olefinically modified polyalkylene oxides include allyloxypolyethylene oxide and methallyloxypolyethylene oxide and other possible olefinically modified alkylene oxide components.

Where the olefinically modified polyalkylene oxide is a polyether, it may be described by the general Formula (11):

$$CH_2=CH(R^{13})(R^{12})_dO(C_2H_4O)_a(C_3H_6O)_b(C_4H_8O)_cR^{16} \tag{11}$$

wherein $R^{13}$ is hydrogen or methyl; $R^{12}$ is a divalent alkyl radical of 1 to 6 carbons where the subscript d may be 0 or 1; $R^{16}$ is hydrogen, a monofunctional hydrocarbon radical of from about 1 to about 6 carbons, or acyl radical from about 1 to about 19 carbon atoms. When the polyether is composed of mixed oxyalkylene groups, such as the non-limiting examples selected from the group consisting of oxyethylene, oxypropylene and oxybutylene, the units may be blocked, or randomly distributed. One skilled in the art will understand the advantages of using a blocked or random configuration. Illustrative examples of blocked configurations are: -(oxyethylene)$_a$(oxypropylene)$_b$-; -(oxybutylene)$_c$(oxyethylene)$_a$-; and -(oxypropylene)$_b$(oxyethylene)$_a$(oxybutylene)$_c$-] wherein a, b and c are zero or positive.

In an embodiment of the present invention, representative examples of polyether reactants containing one or more carbon to carbon double bonds are selected from the non-limiting group of $CH_2=CHCH_2O(CH_2CH_2O)_8H$; $CH_2=CHCH_2O(CH_2CH_2O)_8CH_3$; $CH_2=CHCH_2O(CH_2CH_2O)_8CH_2CH_2CH_3$; $CH_2=CHCH_2O(CH_2CH_2O)_4(CH_2CH(CH_3)O)_5H$; $CH_2=CHO(CH_2CH_2O)_5(CH_2CH(CH_3)O)_5H$; $CH_2=C(CH_3)CH_2O(CH_2CH_2O)_4(CH_2CH(CH_3)O)_5C(=O)CH_3$; and $CH_2=CHCH_2O(CH_2CH_2O)_5(CH_2CH(CH_3)O)_2(CH_2CH(CH_2CH_3)O)_2H$

CATALYST

In an embodiment of the present invention, suitable first step hydrosilylation catalysts include rhodium, ruthenium, palladium, osmium, platinum and iridium complexes. More specifically, a rhodium catalyst is a precious metal catalyst for the first step of the inventive method giving high selectivity. Most specifically, the rhodium catalysts employed to effect the transformation in the first step are complexes of Rh(III) and Rh(I). In another embodiment of the present invention, the hydrosilylation catalysts for the first step are selected from the group or trichlorotris(dibutyl sulfide)rhodium (III); tri(butyl)rhodium chloride and tris(triphenylphosphine)rhodium chloride and more specifically trichlorotris(dibutyl sulfide)rhodium (III) to effect formation of the monohydridosiloxane. A rhodium catalyzed first step reaction results in surprising monohydridosiloxane selectivity at a dihydridosiloxane to olefin ratio of about 1.3:1 to about 1:1.

In another embodiment of the present invention, instances where molar ratio of the dihydridosiloxane compound to the olefin in the first step is less than 4:1 to about 1:1, suitable precious metal catalysts may include complexes of platinum. The platinum catalyst may be selected from those having the formula (PtCl$_2$Olefin) and H(PtCl$_3$Olefin) as described in U.S. Pat. No. 3,159,601, hereby incorporated by reference. In still another embodiment, platinum-containing material may be a complex of chloroplatinic acid with up to 2 moles per gram of platinum of a member selected from the class consisting of alcohols, ethers, aldehydes and mixtures. In yet another embodiment, platinum-containing materials useful in this present invention is a Karstedt catalyst [Pt(H$_2$C=CSiMe$_2$OSiMe$_2$CH=CH$_2$)n].

The precious metal catalysts suitable for manufacture of the organomodified siloxanes in the second step of the method include complexes of rhodium, ruthenium, palladium, osmium, iridium, or platinum. Representative non-limiting examples are selected from the group consisting of Speier's Catalyst [H$_2$PtCl$_6$] and Karstedt's Catalyst [Pt(H$_2$C=CSiMe$_2$OSiMe$_2$CH=CH$_2$)n].

The level of catalyst employed for either step of the method may range from 1000 ppm to 0.5 ppm of the precious metal and more specifically in a range from about 10 ppm to about 3 ppm. The level of catalyst is based on the total charge of the dihydridosiloxane and the olefinic compound.

OTHER REACTION PARAMETERS

In an embodiment of the present invention, the molar ratio of the dihydridosiloxane compound to the olefin in the first step may range from about 10:1 to about 1:1, more specifically from less than about 4:1 to about 1.1:1 most specifically, about 1.2:1. Increasing the ratio of the hydrosiloxane to the olefin may provide measurable increases in selectivity with diminishing returns at drastically elevated ratios. A selectivity of greater than 90% may be achieved with the hydridosiloxane to olefin ratio of greater than 1:1 to 1.3:1. In another embodiment, the molar ratio of the hydrocarbon or heterocarbon containing a carbon to carbon double bond to the monohydridosiloxane in the second step may range from about 10:1 to about 1:1 and more specifically, a ratio of about 1.3:1.

The hydrosilylation reaction of the invention may be conducted over a temperature range of 0 to 120° C., but it is preferable to employ temperatures from 20-80° C. for the first step of the method and 80-100° C. for the second step to provide reasonable rates of reaction and simplicity of equipment configuration.

Reactions may be conducted in "batch," "semi-continuous" or "continuous" fashion with the preferred embodiment being "semi-continuous." For step one of the method (formation of the monohydridosiloxane), operation of the "semi-continuous" embodiment involves a staged addition of the olefinic compound to the hydridosiloxane or hydridosilane to permit control of the reaction temperature. For step two of the method, operation of the "semi-continuous" embodiment involves the staged addition of the monohydridosiloxane or monohydridosilane to the olefin. The mode of operation may be dependent upon the hydridosiloxane and olefinic compound chosen as reaction constituents.

No compatibilizing agent or "solvent" is needed to carry out the process but low levels may be added without compromising effectiveness of the process. If a compatibilizing agent is employed, a stripping or distillation step may need to be incorporated in the process or the solvent may remain in the product.

The hydrosilylation reaction may be optionally conducted in the presence of additives or "buffering" agents, for example a buffering salt that prevents the dehydrocondensation of hydroxyl groups with the SiH moiety. This technology is effective for preventing unwanted side reactions during the hydrosilylation of uncapped polyethers, e.g., allylpolyethylene oxide glycol.

The hydrosilylation reaction may optionally be carried out in the presence of sterically hindered nitrogen compounds. Depending on the method of manufacture and the nature of the reactants, one or more of these additives may already be present during the hydrosilylation reaction. For example, a low, but sometimes adequate, level of carboxylic acid salts or phosphate salts may already be present in olefinically substituted polyalkylene oxides owing to inadvertent exposure to traces of oxygen during subsequent capping of hydroxyl groups with allylic, methallylic, methyl, or acyl groups, or to neutralization of basic catalysts with phosphoric acid. In such instances, the intentional addition of the salt or other additive may be unnecessary.

USE

The asymmetric siloxanes of the invention may impart resistance to hydrolysis over a wide pH range including an enhanced resistance to hydrolysis outside a pH range from 6 to 7.5. Enhanced resistance to hydrolysis may be demonstrated by a variety of tests but as used herein enhanced resistance to hydrolysis means 50 mole percent or more of the hydrolysis resistant composition of the present invention remains unchanged or unreacted after a period of a twenty-four exposure to aqueous acidic conditions where the solution has a pH lower than 6 or after a period of a twenty-four hour exposure to aqueous basic conditions where the solution has a pH greater than 7.5. Under acidic conditions the compositions of the present invention show a survival of 50 mole percent of the original concentration or greater at a pH of 5 or less for a period of time in excess of 48 hours; specifically the compositions of the present invention show a survival of 50 mole percent or greater at a pH of 5 or less for a period of time in excess of 2 weeks; more specifically the compositions of the present invention show a survival of 50 mole percent or greater at a pH of 5 or less for a period of time in excess of 1 month; and most specifically the compositions of the present invention show a survival of 50 mole percent or greater at a pH of 5 or less for a period of time in excess of 6 months. Under basic conditions the compositions of the present invention show a survival of 50 mole percent or greater at a pH of 8 or more for a period of time in excess of 2 weeks; specifically the compositions of the present invention show a survival of 50 mole percent or greater at a pH of 8 or more for a period of time in excess of 4 weeks; more specifically the compositions of the present invention show a survival of 50 mole percent or greater at a pH of 8 or more for a period of time in excess of 6 months; and most specifically the compositions of the present invention show a survival of 50 mole percent or greater at a pH of 8 or more for a period of time in excess of 1 year.

Typical uses for invention product include pesticide, fungicide and insecticide applications and other agrochemical applications including agricultural, horticultural, turf, ornamental, home and garden, veterinary and forestry applications as well as in personal and home care compositions as surfactants, coatings, excipients, surfactants or the like.

PESTICIDE

Many pesticide applications require the addition of an adjuvant to a spray mixture to provide wetting and spreading on foliar surfaces. Often the adjuvant is a siloxane surfactant, which may perform a variety of functions, such as increasing spray droplet retention on difficult to wet leaf surfaces, enhance spreading to improve spray coverage, or to provide penetration of the herbicide into the plant cuticle. These adjuvants are provided either as a tank-side additive or used as a component in pesticide formulations.

The pesticidal compositions of the present invention include at least one pesticide and the asymmetric silicone adjuvant or surfactant, present at an amount sufficient to deliver between 0.005% and 2% to the final use concentration, either as a concentrate or diluted in a tank mix. Optionally the pesticidal composition may include excipients, co-surfactants, solvents, foam control agents, deposition aids, drift retardants, biologicals, micronutrients, fertilizers and the like. The term pesticide means any compound used to destroy pests, e.g., rodenticides, insecticides, miticides, fungicides, and herbicides. Illustrative examples of pesticides, which may be employed include, but are not limited to, growth regulators, photosynthesis inhibitors, pigment inhibitors, mitotic disrupters, lipid biosynthesis inhibitors, cell wall inhibitors, and cell membrane disrupters. The amount of pesticide employed in compositions of the invention varies with the type of pesticide employed. More specific examples of pesticide compounds that may be used with the compositions of the invention are, but not limited to, herbicides and growth regulators, such as: phenoxy acetic acids, phenoxy propionic acids, phenoxy butyric acids, benzoic acids, triazines and s-triazines, substituted ureas, uracils, bentazon, desmedipham, methazole, phenmedipham, pyridate, amitrole, clomazone, fluridone, norflurazone, dinitroanilines, isopropalin, oryzalin, pendimethalin, prodiamine, trifluralin, glyphosate, sulfonylureas, imidazolinones, clethodim, diclofop-methyl, fenoxaprop-ethyl, fluazifop-p-butyl, haloxyfop-methyl, quizalofop, sethoxydim, dichlorobenil, isoxaben, and bipyridylium compounds.

FUNGICIDE

Fungicide compositions that may be used with the present invention include, but are not limited to, aldimorph, tridemorph, dodemorph, dimethomorph; flusilazol, azaconazole, cyproconazole, epoxiconazole, furconazole, propiconazole, tebuconazole and the like; imazalil, thiophanate, benomyl carbendazim, chlorothialonil, dicloran, trifloxystrobin, fluoxystrobin, dimoxystrobin, azoxystrobin, furcaranil, prochloraz, flusulfamide, famoxadone, captan, maneb, mancozeb, dodicin, dodine, and metalaxyl.

INSECTICIDE

Insecticide, larvacide, miticide and ovacide compounds that may be used with the asymmetric siloxane of the invention include *Bacillus thuringiensis,* spinosad, abamectin, doramectin, lepimectin, pyrethrins, carbaryl, primicarb, aldicarb, methomyl, amitraz, boric acid, chlordimeform, novaluron, bistrifluron, triflumuron, diflubenzuron, imidacloprid, diazinon, acephate, endosulfan, kelevan, dimethoate, azinphos-ethyl, azinphos-methyl, izoxathion, chlorpyrifos, clofentezine, lambda-cyhalothrin, permethrin, bifenthrin, cypermethrin and the like.

The pesticide may be a liquid or a solid. If a solid, it is preferable that it is soluble in a solvent, or the asymmetric siloxane of the invention, prior to application, and the silicone may act as a solvent, or surfactant for such solubility or additional surfactants may perform this function.

OTHER AGROCHEMICAL COMPOSITIONS

Buffers, preservatives and other standard excipients known in the art also may be included in an agricultural composition with the asymmetrical silicone of the invention. Solvents may also be included in compositions of the present invention. These solvents are in a liquid state at room temperature. Examples include water, alcohols, aromatic solvents, oils (i.e. mineral oil, vegetable oil, silicone oil, and so forth), lower alkyl esters of vegetable oils, fatty acids, ketones, glycols, polyethylene glycols, diols, paraffinies, and so forth. Particular solvents would be 2,2,4-trimethyl, 1-3-pentane diol and alkoxylated (especially ethoxylated) versions thereof as illustrated in U.S. Pat. No. 5,674,832 herein incorporated by reference, or n-methyl-pyrrilidone.

In another useful embodiment, the agrochemical composition of the present invention further comprises one or more agrochemical ingredients. Suitable agrochemical ingredients include, but not limited to, herbicides, insecticides, growth regulators, fungicides, miticides, acaricides, fertilizers, biologicals, plant nutritionals, micronutrients, biocides, paraffinic mineral oil, methylated seed oils (i.e. methylsoyate or methylcanolate), vegetable oils (such as soybean oil and canola oil), water conditioning agents such as Choice® (Loveland Industries, Greeley, Colo.) and Quest (Helena Chemical, Collierville, Tenn.), modified clays such as Surround® (Englehard Corp.), foam control agents, surfactants, wetting agents, dispersants, emulsifiers, deposition aids, antidrift components, and water.

Suitable agrochemical compositions are made by combining ingredients by mixing one or more of the above components with the organomodified siloxane of the present invention, either as a tank-mix, or as an "In-can" formulation. The term "tank-mix" means the addition of at least one agrochemical to a spray medium, such as water or oil, at the point of use. The term "In-can" refers to a formulation or concentrate containing at least one agrochemical component. The "In-can" formulation may then diluted to use concentration at the point of use, typically in a Tank-mix, or it may be used undiluted.

PERSONAL CARE PRODUCT

The asymmetrical silicone surfactant of the invention may be utilized in personal care emulsions, such as lotions, and creams. A personal care emulsion may comprise at least two immiscible phases one of which is continuous and the other which is discontinuous. Further emulsions may be liquids with varying viscosities or they may be solids. Additionally the particle size of the emulsions may be render them microemulsions and when sufficiently small microemulsions may be transparent. Further it is also possible to prepare emulsions of emulsions and these are generally known as multiple emulsions. These emulsions may be: aqueous emulsions where the discontinuous phase comprises water and the continuous phase comprises the organomodified trisiloxane surfactant of the present invention; aqueous emulsions where the continuous phase comprises the organomodified trisiloxane surfactant of the present invention and the discontinuous phase comprises water; non-aqueous emulsions where the discontinuous phase comprises a non-aqueous hydroxylic solvent and the continuous phase comprises the organomodified trisiloxane surfactant of the present invention; and non-aqueous emulsions where the continuous phase comprises a non-aqueous hydroxylic organic solvent and the discontinuous phase comprises the organomodified trisiloxane surfactant of the present invention.

As used herein the term "non-aqueous hydroxylic organic compound" means hydroxyl containing organic compounds exemplified by alcohols, glycols, polyhydric alcohols and polymeric glycols and mixtures thereof that are liquid at room temperature, e.g. about 25° C., and about one atmosphere pressure. The non-aqueous organic hydroxylic solvents are selected from the group consisting of hydroxyl containing organic compounds comprising alcohols, glycols, polyhydric alcohols and polymeric glycols and mixtures thereof that are liquid at room temperature, e.g. about 25° C., and about one atmosphere pressure. Preferably the non-aqueous hydroxylic organic solvent is selected from the group consisting of ethylene glycol, ethanol, propyl alcohol, iso-propyl alcohol, propylene glycol, dipropylene glycol, tripropylene glycol, butylene glycol, iso-butylene glycol, methyl propane diol, glycerin, sorbitol, polyethylene glycol, polypropylene glycol mono alkyl ethers, polyoxyalkylene copolymers and mixtures thereof.

Once the desired form is attained whether as a silicone only phase, an anhydrous mixture comprising the silicone phase, a hydrous mixture comprising the silicone phase, a water-in-oil emulsion, an oil-in-water emulsion, or either of the two non-aqueous emulsions or variations thereon, the resulting material is usually a cream or lotion with improved deposition properties and good feel characteristics. It is capable of being blended into formulations for hair care, skin care, antiperspirants, sunscreens, cosmetics, color cosmetics, insect repellants, vitamin and hormone carriers, fragrance carriers and the like.

Personal care applications for the inventive asymmetrical silicone include deodorants, antiperspirants, antiperspirant/deodorants, shaving products, skin lotions, moisturizers, toners, bath products, cleansing products, hair care products such as shampoos, conditioners, mousses, styling gels, hair sprays, hair dyes, hair color products, hair bleaches, waving products, hair straighteners, manicure products such as nail polish, nail polish remover, nail creams and lotions, cuticle softeners, protective creams such as sunscreen, insect repellent and anti-aging products, color cosmetics such as lipsticks, foundations, face powders, eye liners, eye shadows, blushes, makeup, mascaras and other personal care formulations where silicone components have been conventionally added, as well as drug delivery systems for topical application of medicinal compositions that are to be applied to the skin.

In another useful embodiment, a personal care composition of the invention further comprises one or more personal care ingredients. Suitable personal care ingredients include, for example, emollients, moisturizers, humectants, pigments, including pearlescent pigments such as, for example, bismuth oxychloride and titanium dioxide coated mica, colorants, fragrances, biocides, preservatives, antioxidants, anti-microbial agents, anti-fungal agents, antiperspirant agents, exfoliants, hormones, enzymes, medicinal compounds, vitamins, salts, electrolytes, alcohols, polyols, absorbing agents for ultraviolet radiation, botanical extracts, surfactants, silicone oils, organic oils, waxes, film formers, thickening agents such as, for example, fumed silica or hydrated silica, particulate fillers, such as for example, talc, kaolin, starch, modified starch, mica, nylon, clays, such as, for example, bentonite and organo-modified clays.

Suitable personal care compositions are made by mixing one or more of the above components with the asymmetrical silicone surfactant. Suitable personal care compositions may be in the form of a single phase or in the form of an emulsion, including oil-in-water, water-in-oil and anhydrous emulsions where the silicone phase may be either the discontinuous phase or the continuous phase, as well as multiple emulsions, such as, for example, oil-in water-in-oil emulsions and water-in-oil-in water-emulsions.

In one useful embodiment, an antiperspirant composition comprises the organomodified trisiloxane surfactant of the present invention and one or more active antiperspirant agents. Suitable antiperspirant agents include, for example, the Category I active antiperspirant ingredients listed in the U.S. Food and Drug Administration's Oct. 10, 1993 Monograph on antiperspirant drug products for over-the-counter human use, such as, for example, aluminum halides, aluminum hydroxyhalides, for example, aluminum chlorohydrate, and complexes or mixtures thereof with zirconyl oxyhalides and zirconyl hydroxyhalides, such as for example, aluminum-zirconium chlorohydrate, aluminum zirconium glycine complexes, such as, for example, aluminum zirconium tetrachlorohydrex glycine.

In another useful embodiment, a skin care composition comprises the organomodified trisiloxane surfactant, and a vehicle, such as, for example, a silicone oil or an organic oil. The skin care composition may, optionally, further include emollients, such as, for example, triglyceride esters, wax esters, alkyl or alkenyl esters of fatty acids or polyhydric alcohol esters and one or more the known components conventionally used in skin care compositions, such as, for example, pigments, vitamins, such as, for example, Vitamin A, Vitamin C and Vitamin E, sunscreen or sunblock compounds, such as, for example, titanium dioxide, zinc oxide, oxybenzone, octylmethoxy cinnamate, butylmethoxy dibenzoylm ethane, p-aminobenzoic acid and octyl dimethyl-p-aminobenzoic acid.

In another useful embodiment, a color cosmetic composition, such as, for example, a lipstick, a makeup or a mascara composition comprises the organomodified trisiloxane surfactant, and a coloring agent, such as, for example, a pigment, a water soluble dye or a liposoluble dye.

In another useful embodiment, the compositions of the present invention are utilized in conjunction with fragrant materials. These fragrant materials may be fragrant compounds, encapsulated fragrant compounds, or fragrance releasing compounds that either the neat compounds or are encapsulated. Particularly compatible with the compositions of the present invention are the fragrance releasing silicon containing compounds as disclosed in U.S. Pat. Nos. 6,046,156; 6,054,547; 6,075,111; 6,077,923; 6,083,901; and 6,153,578; all of which are herein and herewith specifically incorporated by reference.

The uses of the compositions of the present invention are not restricted to personal care compositions, other products such as waxes, polishes and textiles treated with the compositions of the present invention are also contemplated.

HOME CARE COMPOSITION

Home care applications include laundry detergent and fabric softener, dishwashing liquids, wood and furniture polish, floor polish, tub and tile cleaners, toilet bowl cleaners, hard surface cleaners, window cleaners, antifog agents, drain cleaners, auto-dish washing detergents and sheeting agents, carpet cleaners, prewash spotters, rust cleaners and scale removers.

COATING

The asymmetrical silicone of the invention may be included in a coating composition as a wetting agent or surfactant for the purpose of emulsification, compatibilization of components, leveling, flow and reduction of surface defects. Additionally, the asymmetrical silicone may provide improvements in cured or dry film, such as improved abrasion resistance, antiblocking, hydrophilic, and hydrophobic properties. Coatings formulations may exists as, Solvent-borne coatings, water-borne coatings and powder coatings.

An asymmetrical silicone coating composition may be employed as an architecture coating; OEM product coating such as an automotive coating and coil coating and as a special purpose coating such as an industrial maintenance coating or marine coating.

SURFACTANT

The asymmetrical silicone may be used as a surfactant. Moreover, other co-surfactants, which have short chain hydrophobes that do not interfere with superspreading. The surfactants useful herein with the asymmetrical silicone include nonionic, cationic, anionic, amphoteric, zwitterionic, polymeric surfactants, or any mixture thereof. Surfactants are typically hydrocarbon based, silicone based or fluorocarbon based. Other useful surfactants include alkoxylates, especially ethoxylates, containing block copolymers including copolymers of ethylene oxide, propylene oxide, butylene oxide, and mixtures thereof; alkylarylalkoxylates, especially ethoxylates or propoxylates and their derivatives including alkyl phenol ethoxylate; arylarylalkoxylates, especially ethoxylates or propoxylates, and their derivatives; amine alkoxylates, especially amine ethoxylates; fatty acid alkoxylates; fatty alcohol alkoxylates; alkyl sulfonates; alkyl benzene and alkyl naphthalene sulfonates; sulfated fatty alcohols, amines or acid amides; acid esters of sodium isethionate; esters of sodium sulfosuccinate; sulfated or sulfonated fatty acid esters; petroleum sulfonates; N-acyl sarcosinates; alkyl polyglycosides; alkyl ethoxylated amines; and so forth.

Specific examples include alkyl acetylenic diols (SURFONYL—Air Products), pyrrilodone based surfactants (e.g., SURFADONE—LP 100-ISP), 2-ethyl hexyl sulfate, isodecyl alcohol ethoxylates (e.g., RHODASURF DA 530—Rhodia), ethylene diamine alkoxylates (TETRONICS—BASF), and ethylene oxide/propylene oxide copolymers (PLURONICS—BASF) and Gemini type surfactants (Rhodia).

Preferred surfactants with the inventive asymmetrical silicone include ethylene oxide/propylene oxide copolymers (EO/PO); amine ethoxylates; alkyl polyglycosides; oxotridecyl alcohol ethoxylates, and so forth.

The following Examples are illustrative and should not be construed as a limitation on the scope of the claims unless a limitation is specifically recited.

EXAMPLES

The process of the present invention is illustrated by the following examples. All percentages are by weight unless otherwise indicated. In a generalized processing to form the asymmetric organomodified siloxane a dihydridosiloxane is weighed into a reaction vessel. The vessel is fitted with a thermocouple, dry-ice condenser, nitrogen purge tube, addition funnel and overhead stirrer. A desired quantity of catalyst is added to the dihydridosiloxane in the reaction vessel. A predetermined amount of olefin is added via an addition funnel. Agitation of the vessel contents is initiated at ambient temperature. Addition of the olefin is initiated at a controlled rate in order to maintain the temperature of the reaction to less than 70° C. Upon completion of olefin addition, the material is held at 70° C. to ensure reaction completion. Depending upon the excess of the dihydridosiloxane employed and the desired purity of the monohydridosiloxane product, the resulting product may either be distilled or stripped prior to the next step in the sequence.

A desired olefin for the second hydrosilylation step of the method is weighed into a reaction vessel along with 10-15 weight percent of the total monohydridosiloxane charge (the total monohydridosiloxane charge is based upon the molar excess of olefin desired). The vessel is fitted with an overhead stirrer, dry-ice condenser, nitrogen purge tube, addition funnel and overhead stirrer. A remaining amount of the monohydridosiloxane is then added to the addition funnel. Agitation of the vessel contents is initiated and the temperature of the vessel contents brought to 80° C. A desired quantity of the selected second hydrosilylation catalyst is added to the reaction vessel and the exotherm monitored. Once the temperature of the reaction plateaus, addition of the monohydridosiloxane is initiated at a controlled rate in order to maintain the temperature of the reaction to less than 110° C. Upon completion of olefin addition, the material is held at 90° C. to ensure reaction completion. The product material is stripped to remove residual lites.

Example 1

Step 1—Formation of 1-(2-trimethylsilylethyl)-1,1,3,3-tetramethyldisiloxane (1 Mole of TMDSO to 1 Mole of TMVS)

To a 4-necked, 1 L round bottom flask, equipped with an overhead stirrer, dry ice/IPA condenser, temperature controller, nitrogen purge tube and a 500 mL addition funnel, the following materials were charged: 288.9 grams of tetramethyldisiloxane (TMDSO; purity=97%), and 96 microliters of tris(dibutylsulfide)rhodium trichloride (rhodium catalyst; 3% Rh; 5 ppm Rh). Next, 211.1 grams of trimethylvinylsilane (TMVS; 99% purity) was added to the addition funnel. Agitation of the flask contents was initiated at ambient temperature (23° C.) along with the slow addition of TMVS. An exotherm was noted within 2 minutes of the addition of the TMVS to the flask. The TMVS was added to the agitating mixture at a rate of 1.35 g/min in order to keep the reaction temperature under 70° C. Upon completion of the addition of TMVS, the reaction mixture was allowed to stir for an additional 30 minutes. The resultant product purity as analyzed by gas chromatography contained 90.2% of the 1-(2-trimethylsilylethyl)-1,1,3,3-tetramethyldisiloxane (Structure 1), 7.1% of the bis-adduct and 1.7% TMDSO. Isolation of the pure product was effected via distillation. To a 2 L, 2-necked round bottom flask equipped with a magnetic stir bar, 10-tray vacuum jacketed Oldershaw distillation column (inner diameter=1 inch), distillation head, 500 mL receiver, heating mantle and temperature controller, was added 946.6 grams of the crude product. A digital manometer, dry ice/IPA trap, and vacuum pump were then attached to the set-up. Agitation was initiated along with heating of the flask contents. Product was distilled overhead at 135° C. and 9 mm Hg vacuum. 810.1 grams of greater than 99% pure (via GC) 1-(2-trimethylsilylethyl)-1,1,3,3-tetramethyldisiloxane (Structure 1) was obtained. The balance of the material was comprised of 12.6 grams of lites and 120 grams of heavies for a total recovery of 99.6% of the starting crude material.

Structure 1

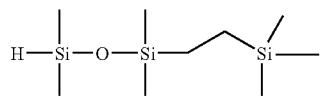

Step 2—Hydrosilylation of 1-(2-trimethylsilylethyl)-1,1,3,3-tetramethyldisiloxane To a 4-necked, 500 mL round bottom flask, equipped with an overhead stirrer, Friedrich condenser, temperature controller, nitrogen purge tube and 250 mL addition funnel, were charged 211.4 grams of a methyl capped allylpolyethyleneglycol (MW~400 g/mole). To the addition funnel was added 89.0 grams of 1-(2-trimethylsilylethyl)-1,1,3,3-tetramethyldisiloxane from Step 1. Under a nitrogen agitation was initiated and the temperature of the flask contents brought to 80° C. At 80° C., the reaction was catalyzed with 0.14 mL of 3.3% hexachloroplatinic acid solution in ethanol (5 ppm) and the addition of 1-(2-trimethylsilylethyl)-1,1,3,3-tetramethyldisiloxane was initiated. Within two minutes, the reaction exothermal. The 1-(2-trimethylsilylethyl)-1,1,3,3-tetramethyldisiloxane was added to the agitating mixture at a rate that enabled control of the reaction temperature. Upon completion of the addition of 1-(2-trimethylsilylethyl)-1,1,3,3-tetramethyldisiloxane, the reaction mixture was allowed to stir for an additional 90 minutes at 80° C. No residual silanic hydrogen was detected in the product (Structure 2).

Structure 2

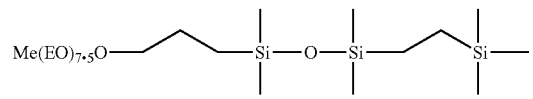

Example 2

Step 1—Formation of 1-(2-trimethylsilylethyl)-1,1,3,3-tetramethyldisiloxane (1.33 Moles of TMDSO to 1 Mole of TMVS)

To a 4-necked, 1 L round bottom flask, equipped with an overhead stirrer, dry ice/IPA condenser, temperature controller, nitrogen purge tube and a 500 mL addition funnel, the following materials were charged: 320.5 grams of tetramethyldisiloxane (TMDSO; purity=97%), and 96 microliters of tris(dibutylsulfide)rhodium trichloride (rhodium catalyst; 3% Rh; 5 ppm Rh). Next, 179.5 grams of trimethylvinylsilane (TMVS; 99% purity) was added to the addition funnel. Agitation of the flask contents was initiated at ambient temperature (23° C.) along with the slow addition of TMVS. An exotherm was noted within 2 minutes of the addition of the TMVS to the flask. The TMVS was added to the agitating mixture at a rate of 1.26 g/min in order to keep the reaction temperature under 70° C. Upon completion of the addition of TMVS, the reaction mixture was allowed to stir for an additional 30 minutes. The resultant product purity as analyzed by gas chromatography was 81.7% of the 1-(2-trimethylsilylethyl)-1,1,3,3-tetramethyldisiloxane (Structure 1), 2.5% of the bis-adduct and 15.4% TMDSO. Isolation of the product was effected via stripping. In this particular instance, the aim of the strip was solely to remove the lites from the mixture. To a 1 L, 4-necked round bottom flask equipped with a pneumatic overhead stirrer, 10-tray vacuum jacketed Oldershaw distillation column (inner diameter=1 inch), distillation head, 500 mL receiver, heating mantle and temperature controller, was added 497.3 grams of the crude product. A digital manometer, dry ice/IPA trap, and vacuum pump were then attached to the set-up. Agitation was initiated along with heating of the flask contents. At a temperature of 140° C. and a vigorous $N_2$ sparge, 74.1 grams of lites (95.4% TMDSO) was removed from the flask contents. The remaining material in the flask (414.8 grams) was comprised of the 1-(2-trimethylsilylethyl)-1,1,3,3-tetramethyldisiloxane (Structure 1) (94.8% via GC) and the bis-substituted by-product (5.2% via GC). This represented a total recovery of 98.3% of the starting crude material.

Structure 1

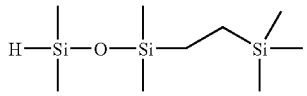

Step 2—Hydrosilylation of 1-(2-trimethylsilylethyl)-1,1,3,3-tetramethyldisiloxane To a 4-necked, 500 mL round bottom flask, equipped with an overhead stirrer, Friedrich condenser, temperature controller, nitrogen purge tube and 250 mL addition funnel, were charged 208.8 grams of a methyl capped allylpolyethyleneglycol (MW~400 g/mole). To the addition funnel was added 91.5 grams of 1-(2-trimethylsilylethyl)-1,1,3,3-tetramethyldisiloxane from Step 1. Under a nitrogen blanket, agitation was initiated and the temperature of the flask contents brought to 80° C. At 80° C., the reaction was catalyzed with 16 μL of 3.3% hexachloroplatinic acid solution in ethanol (5 ppm) and the addition of 1-(2-trimethylsilylethyl)-1,1,3,3-tetramethyldisiloxane was initiated. Within two minutes, the reaction exothermal. The 1-(2-trimethylsilylethyl)-1,1,3,3-tetramethyldisiloxane was added to the agitating mixture at a rate of 1.73 g/min in order to control the reaction temperature. Upon completion of the addition of 1-(2-trimethylsilylethyl)-1,1,3,3-tetramethyldisiloxane, the reaction mixture was allowed to stir for an additional 90 minutes at 80° C. No residual silanic hydrogen was detected in the product (Structure 2).

Structure 2

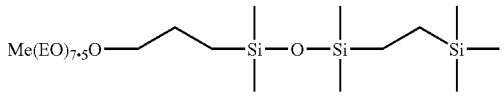

Example 3

Step 1—Formation of 1-(2-trimethylsilylethyl)-1,1,3,3-tetramethyldisiloxane (1.5 Moles of TMDSO to 1 Mole of TMVS)

To a 4-necked, 250 mL round bottom flask, equipped with a stirrer, dry ice/IPA condenser, temperature controller, nitrogen purge tube and a 500 mL addition funnel, the following materials were charged: 51.6 grams of tetramethyldisiloxane (TMDSO; purity=97%), tris(triphenylphosphine)rhodium chloride (rhodium catalyst; 100 ppm Rh). Next, 25.6 grams of trimethylvinylsilane (TMVS; 99% purity) was added to the addition funnel. Agitation of the flask contents was initiated and the temperature brought to 60° C. Addition of the TMVS was initiated and an exotherm was noted within 2 minutes of the addition of the TMVS to the flask. The TMVS was added to the agitating mixture at a rate of 1.0 g/min in order to keep the reaction temperature under 70° C. Upon completion of the addition of TMVS, the reaction mixture was allowed to stir for an additional hour at 65° C., then sampled for GC analysis; found residual tetramethyldisiloxane and 94:6 $M'M^R:M^RM^R$). The resulting material was distilled fractionally under vacuum (approx. 30 mm Hg) to yield 51.6 g of 1-(2-trimethylsilylethyl)-1,1,3,3-tetramethyldisiloxane (Structure 1), 99.1% GC purity.

Step 2—Hydrosilylation of 1-(2-trimethylsilylethyl)-1,1,3,3-tetramethyldisiloxane To a 4-necked, 100 mL round bottom flask, equipped with an overhead stirrer, Friedrich condenser, temperature controller, nitrogen purge tube and addition funnel, were charged 11.5 grams of a methyl capped allylpolyethyleneglycol (MW~400 g/mole) and 3 grams of isopropanol. To the addition funnel was added 5 grams of 1-(2-trimethylsilylethyl)-1,1,3,3-tetramethyldisiloxane from Step 1. Under a nitrogen blanket, agitation was initiated and the temperature of the flask contents brought to 70° C. At 70° C., the reaction was catalyzed with 16 μL of 3.3% hexachloroplatinic acid solution in ethanol (10 ppm) and the addition of 1-(2-trimethylsilylethyl)-1,1,3,3-tetramethyldisiloxane was initiated. Within two minutes, the reaction exothermal. The 1-(2-trimethylsilylethyl)-1,1,3,3-tetramethyldisiloxane was added to the agitating mixture at a rate that enabled control of the reaction temperature. Upon completion of the addition of 1-(2-trimethylsilylethyl)-1,1,3,3-tetramethyldisiloxane, the reaction mixture was allowed to stir for an additional 60 minutes at 70° C. No residual silanic hydrogen was detected in the product. The product was permitted to cool to room temperature, neutralized with damp sodium bicarbonate, filtered with Celite, and stripped at 70° C. and 5 mm Hg for 2 hours to yield 12.1 g of a clear, pale yellow fluid (Structure 2).

Structure 2

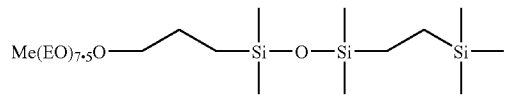

The invention includes changes and alterations that fall within the purview of the following claims. The foregoing examples are merely illustrative of the invention, serving to illustrate only some of the features of the present invention. The appended claims are intended to claim the invention as broadly as it has been conceived and the examples herein presented are illustrative of selected embodiments from a manifold of all possible embodiments. Accordingly it is Applicants' intention that the appended claims are not to be limited by the choice of examples utilized to illustrate features of the present invention.

As used in the claims, the word "comprises" and its grammatical variants logically also subtend and include phrases of varying and differing extent such as for example, but not limited thereto, "consisting essentially of" and "consisting of."

Where necessary, ranges have been supplied, those ranges are inclusive of all sub-ranges there between. Such ranges may be viewed as a Markush group or groups consisting of differing pairwise numerical limitations which group or groups is or are fully defined by its lower and upper bounds, increasing in a regular fashion numerically from lower bounds to upper bounds. It is to be expected that variations in these ranges will suggest themselves to a practitioner having ordinary skill in the art and where not already dedicated to the public, those variations should where possible be construed to be covered by the appended claims.

It is also anticipated that advances in science and technology will make equivalents and substitutions possible that are not now contemplated by reason of the imprecision of language and these variations should also be construed where possible to be covered by the appended claims.

All United States patents (and patent applications) referenced herein are herewith and hereby specifically incorporated by reference in their entirety as though set forth in full.

The invention includes changes and alterations that fall within the purview of the following claims.

What is claimed is:

1. A method to make an asymmetrically substituted organosiloxane containing at least one polyalkylene oxide group comprising:
    (a) in a first step, reacting a dihydridosiloxane having the chemical Formula (1), $$M^H D_x M'H \tag{1}$$

in the presence of a tris(dibutylsulfide)rhodium trichloride hydrosilylation catalyst under selective hydrosilylation conditions with an unsaturated hydrocarbon comprising a vinyl silane to form a monohydridosiloxane wherein: each occurrence of $M^H$ is independently selected from the species $R^1R^2HSiO_{1/2}$; each occurrence of $M'^H$ is independently selected from the species $R^4R^5HSiO_{1/2}$; each occurrence of D is independently selected from the species $(R)_2SiO$; each occurrence of the subscript x is independently an integer from about 0 to about 10; each occurrence of R, $R^1$, $R^2$, $R^4$ and $R^5$ is independently selected from the group consisting of a hydrocarbon of from 1 to about 50 carbon atoms and a heterocarbon of from about 1 to 100 carbon atoms containing at least one oxygen or at least one silicon atom that has replaced a carbon atom; and
    (b) in a second step, hydrosilylating the monohydridosiloxane with a different unsaturated hydrocarbon containing from about 2 to about 100 carbon atoms and one or more terminal carbon to carbon double bonds or with a different unsaturated heterocarbon containing from about 3 to about 100 carbon atoms, one or more terminal carbon to carbon double bonds and at least one oxygen or at least one silicon atom that has replaced a carbon atom in the presence of the same or different precious metal hydrosilylation catalyst to form an asymmetric siloxane and with the proviso that at least one heterocarbon containing one or more terminal carbon to carbon double bonds is a polyalkylene oxide compound with one or more terminal carbon to carbon double bonds.

2. The method of claim 1, wherein at least one of $R^1$, $R^2$, $R^4$ and $R^5$ is independently a same or different $C_1$ to $C_{12}$ alkyl radical selected from the group consisting of methyl, ethyl, propyl, butyl, isopentyl, n-hexyl and decyl.

3. The method of claim 1, wherein the polyalkylene oxide is a polyether defined by the general formula:

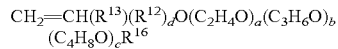

where $R^{13}$ is H or methyl; $R^{12}$ is a divalent alkyl radical of 1 to 6 carbons where the subscript d may be 0 or 1; and $R^{16}$ is H, a monofunctional hydrocarbon radical of 1 to 6 carbons, or acetyl and where the subscripts a, b and c are zero or positive and satisfy the following relationships; 2 is less than or equal to a+b+c, which total less than or equal to 20 with a greater than or equal to 2.

4. The method of claim 1, wherein the polyalkylene oxide is a polyether comprising a random or blocked configuration selected from the group consisting of -(oxyethylene)$_a$(oxypropylene)$_b$-, -(oxybutylene)$_c$(oxyethylene)$_a$- and -(oxypropylene)$_b$(oxyethylene)$_a$(oxybutylene)$_c$-.

5. The method of claim 1, wherein the polyalkylene oxide is a polyether comprising a member selected from the group consisting of $CH_2$=$CHCH_2O(CH_2CH_2O)_8H$; $CH_2$=$CHCH_2O(CH_2CH_2O)_8CH_3$; $CH_2$=$CHCH_2O(CH_2CH_2O)_4CH_2CH(CH_3)O_5H$; $CH_2$=$CHO(CH_2CH_2O)_5(CH_2CH(CH_3)O)_5H$; $CH_2$=$C(CH_3)CH_2O(CH_2CH_2O)_4(CH_2CH(CH_3)O)_5C(=O)CH_3$; and $CH_2$=$CHCH_2O(CH_2CH_2O)_5(CH_2CH(CH_3)O)_2(CH_2CH(CH_2CH_3)O)_2H$.

6. The method of claim 1, wherein x=0 ($M^H M'^H$).

7. A method to make an asymmetric organosiloxane comprising in a first step, reacting a molar excess up to less than 4:1 of a dihydridosiloxane under hydrosilylation conditions in the presence of a rhodium hydrosilylation catalyst, with a vinyl silane to form a monohydridosiloxane, and in a second step, hydrosilylating the monohydridosiloxane with a second and different hydrocarbon or heterocarbon compound containing a terminal carbon to carbon double bond and in the presence of the same or different hydrosilylation catalyst under hydrosilylation conditions to form an asymmetrically substituted organosiloxane, wherein the asymmetric organosiloxane product contains at least one polyalkylene oxide group.

8. The method of claim 7, wherein the alkylene oxide is a methyl capped allylpolyethyleneglycol.

9. The method of claim 7, wherein the alkylene oxide comprises a polyether defined by the general formula:

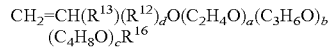

where $R^{13}$ is H or methyl; $R^{12}$ is a divalent alkyl radical of 1 to 6 carbons where the subscript d may be 0 or 1; and $R^{16}$ is H, a monofunctional hydrocarbon radical of 1 to 6 carbons, or acetyl and where the subscripts a, b and c are zero or positive and satisfy the following relationships: 2 is less than or equal to a+b+c, which total less than or equal to 20 with a greater than or equal to 2.

10. The method of claim 7, wherein the alkylene oxide comprises a polyether comprising a random or blocked configuration selected from the group consisting of -(oxyethylene)$_1$(oxypropylene)$_b$-, -(oxybutylene)$_c$(oxyethylene)$_a$- and -(oxypropylene)$_b$(oxyethylene)$_a$(oxybutylene)$_c$-.

11. The method of claim 7, wherein the alkylene oxide comprises a polyether comprising a member selected from the group consisting of $CH_2$=$CHCH_2O(CH_2CH_2O)_8H$; $CH_2$=$CHCH_2O(CH_2CH_2O)_8CH_3$; $CH_2$=$CHCH_2O$ $(CH_2CH_2O)_4(CH_2CH(CH_3)O)_5H$; $CH_2=CHO(CH_2CH_2O)_5(CH_2CH(CH_3)O)_5H$; $CH_2=C(CH_3)CH_2O(CH_2CH_2O)_4(CH_2CH(CH_3)O)_5C(=O)CH_3$; and $CH_2=CHCH_2O(CH_2CH_2O)_5(CH_2CH(CH_3)O)_2(CH_2CH(CH_3)O)_2H$.

12. The method of claim 7, comprising reacting the dihydridosiloxane with a vinylsilane selected from the group consisting of trimethylvinylsilane, triethylvinylsilane, dimethyl-tert-butoxyvinylsilane, dimethylisopropoxyvinylsilane, tris-(trimethylsiloxy)vinylsilane, methyl-bis-(tert-butoxy)vinylsilane and tris-(tert-butoxy)vinylsilane.

13. The method of claim 7, wherein the rhodium catalyst is a complex of Rh(III) or Rh(I).

14. The method of claim 7, wherein the rhodium catalyst is trichlorotris(dibutyl sulfide)rhodium (III).

15. The method of claim 7, wherein the rhodium catalyst is tris(triphenylphosphine)rhodium chloride.

16. The method of claim 7, comprising isolating the monohydridosiloxane reaction product of the first step.

17. The method of claim 7, comprising reacting a molar excess of dihydridosiloxane to hydrocarbon or heterocarbon compound containing a terminal carbon to carbon double bond vinyl silane of 1.3:1 to greater than 1:1.

18. The method of claim 7, comprising isolating the monohydridosiloxane of the first step and then conducting the second step on the isolated monohydridosiloxane.

* * * * *

UNITED STATES PATENT AND TRADEMARK OFFICE
CERTIFICATE OF CORRECTION

PATENT NO. : 7,326,761 B1
APPLICATION NO. : 11/503213
DATED : February 5, 2008
INVENTOR(S) : Farris It is certified that error appears in the above-identified patent and that said Letters Patent is hereby corrected as shown below:

at col. 4, line 27, "catalysts" should be --catalyst--;
at col. 6, line 25, "branched" should be --a branched--; and
at col. 20, line 37, "quadratureL" should be --µL--.

Signed and Sealed this

Third Day of June, 2008

JON W. DUDAS
*Director of the United States Patent and Trademark Office*